United States Patent
Bland

[11] 3,773,178
[45] Nov. 20, 1973

[54] FILTRATION SYSTEM FOR PHOSPHATIZING BATHS

[75] Inventor: Marshall Richard Bland, Long Beach, Calif.

[73] Assignee: Purex Corporation, Limited, Lakewood, Calif.

[22] Filed: Mar. 8, 1971

[21] Appl. No.: 122,216

Related U.S. Application Data

[62] Division of Ser. No. 778,119, Nov. 22, 1968, abandoned.

[52] U.S. Cl. ............................... 210/136, 210/333
[51] Int. Cl. ............................................. B01d 35/16
[58] Field of Search .................... 210/136, 167, 196, 210/312, 333, 345, 408

[56] References Cited
UNITED STATES PATENTS

| | | | |
|---|---|---|---|
| 2,221,210 | 11/1940 | Soderquist | 210/196 |
| 3,522,886 | 8/1970 | Edmiston et al. | 210/345 |
| 3,395,099 | 7/1968 | Johnson | 210/136 X |
| 2,667,270 | 1/1954 | Cady et al. | 210/196 |
| 3,280,978 | 10/1966 | Scott | 210/408 X |
| 2,440,487 | 4/1948 | Rayburn | 210/345 |
| 2,784,846 | 3/1957 | Olson et al. | 210/333 |
| 3,202,284 | 8/1965 | Wade | 210/346 X |
| 3,253,431 | 5/1966 | Minhinnett | 210/196 X |

Primary Examiner—Frank A. Spear, Jr.
Attorney—White, Haefliger & Bachand

[57] ABSTRACT

Sludge removal from chemical treating baths such as phosphating baths is effected in an improved manner by passing a sludge containing portion of the bath through a flow reversible filter in pressure communication with a pump for separation of sludge as a compressed mass and return of virtually all the solution as sludge-free filtrate to the bath.

4 Claims, 3 Drawing Figures

PATENTED NOV 20 1973 3,773,178

FILTRATION SYSTEM FOR PHOSPHATIZING BATHS

REFERENCE TO RELATED APPLICATION

This application is a Division of Application Ser. No. 778,119, filed Nov. 22, 1968, now abandoned.

BACKGROUND OF THE INVENTION

1. Field of the Invention

This invention has to do with improvements in chemical treating of metals. More particularly the invention is concerned with method and apparatus for more economically, efficiently and effectively conducting metal treating operations which generate in situ precipitates such as the gelatinous sludge by-product of phosphating baths. These precipitates are metal salts, which unless removed, clog spray nozzles ordinarily used to apply the phosphating solution, foul other fluid handling equipment and in some cases prevent obtaining of a smooth, treated surface on the metal part.

Metals are typically reactive and must be provided with protective coatings against chemical attack e.g. corrosion. Organic coatings such as paints are used, but in place of or in addition to such coatings, it is often desirable to form a coating by chemical modification of the metal surface, such treatments being known as conversion coatings. Conversion coatings are effected by dipping or spraying the metal surface into or with the reagent. Foremost among conversion coating reagents are the metal phosphates and chromates. Phosphate conversion coatings provide an excellent substrate for organic coatings such as paints on such diverse metals as steel, iron, zinc, aluminum, tin and cadmium. Using iron as typical, the reaction is effected by forming a secondary iron phosphate on the metal surface through reaction with free phosphoric acid in the treating solution. Various additives developed over the years have increased reaction speed, but also in some instances the generation of insoluble by-products which appear as finely divided, often gelatinous precipitates of a particularly difficultly separable nature which are commonly denominated "sludge." As mentioned, this sludge will ultimately shut down a phosphating operation through spray nozzle clogging or through disruption of surface perfection on treated metals.

2. Prior Art

Separation of sludge has been accomplished in the past with batch gravity settling of the treating bath and decanting of the supernatant liquid. This procedure is very time consuming and is wasteful of treating solution since much effective solution is entrapped in and thrown away with the sludge. In-line separation of sludge has been proposed using a gravity operated filter in a manner representing only a refinement of the gravity batch technique. This procedure is ineffective because of a loss of heat from the solution in its slow passage through the gravity filters and because as in the batch process valuable solution is separated and thrown away with the sludge.

SUMMARY OF THE INVENTION

It is accordingly a major objective of this invention to provide improved sludge separation for chemical treating baths, in-line without undue heat loss, and with minimum loss of treating solution.

In accordance with the invention a method is provided for separating finely divided solids from a chemical treating bath solution which includes continually drawing a solids-containing portion of the solution from the bath into the intake side of a pump, discharging the portion from the pump against a filtering medium in a manner to maintain the solution portion under pump pressure e.g. up to 30 pounds gage between the pump and the filtering medium to drive the liquid component of the solution portion through the filtering medium for return to the bath solution as filtrate; and periodically reversing solution flow through the filtering medium to flush filtered solids from the system. The separating step is carried out during chemical treatment effected by the bath solution through reaction of chemical reagents in the solution with the surfaces of metal parts dipped in the bath or sprayed with bath solution. The filter medium may be formed on a porous-to-liquid filter medium support by coating the support in use with finely divided solids generated in the bath solution. The filter medium may be periodically unformed and reformed to renew the filtering effectiveness thereof.

Apparatus is provided for carrying out the above method of separating finely divided solids from a tank containing a chemical treating bath solution, which comprises pumping means having an inlet and an outlet and arranged to draw a solids-containing portion of the solution to its inlet and to discharge the same under pressure from its outlet, and flow-reversible filtering means in pressure communication with the pumping means outlet for selectively passing the liquid component of the solution as filtrate and means to return the filtrate to the bath solution. The filtering means may comprise filter elements of filter fabric supported on support means either edgewise or at the edges and between edges such as a grid-like frame. The filter elements in preferred embodiments are radially arranged and in vertically disposed array within an enclosure and means are provided for passing the solution portion upwardly along the elements in filtering relation as are means for conveying the filtrate downwardly out of filtering contact with the elements. Manifold means may be provided within the enclosure to collect filtrate for passage through the enclosure outlet and return to the bath.

Importantly, means are provided for periodically reversing flow direction through the filtering means to back-wash the filter elements and dispose of solids accumulations.

The just described apparatus is connected to a chemical treating tank which may contain a free phosphoric acid containing treating solution and desirably in a manner such that a filtrate return pipe agitates the solution near the tank bottom to preclude sediment build-up there.

DESCRIPTION OF THE PREFERRED EMBODIMENTS

Figure 1:
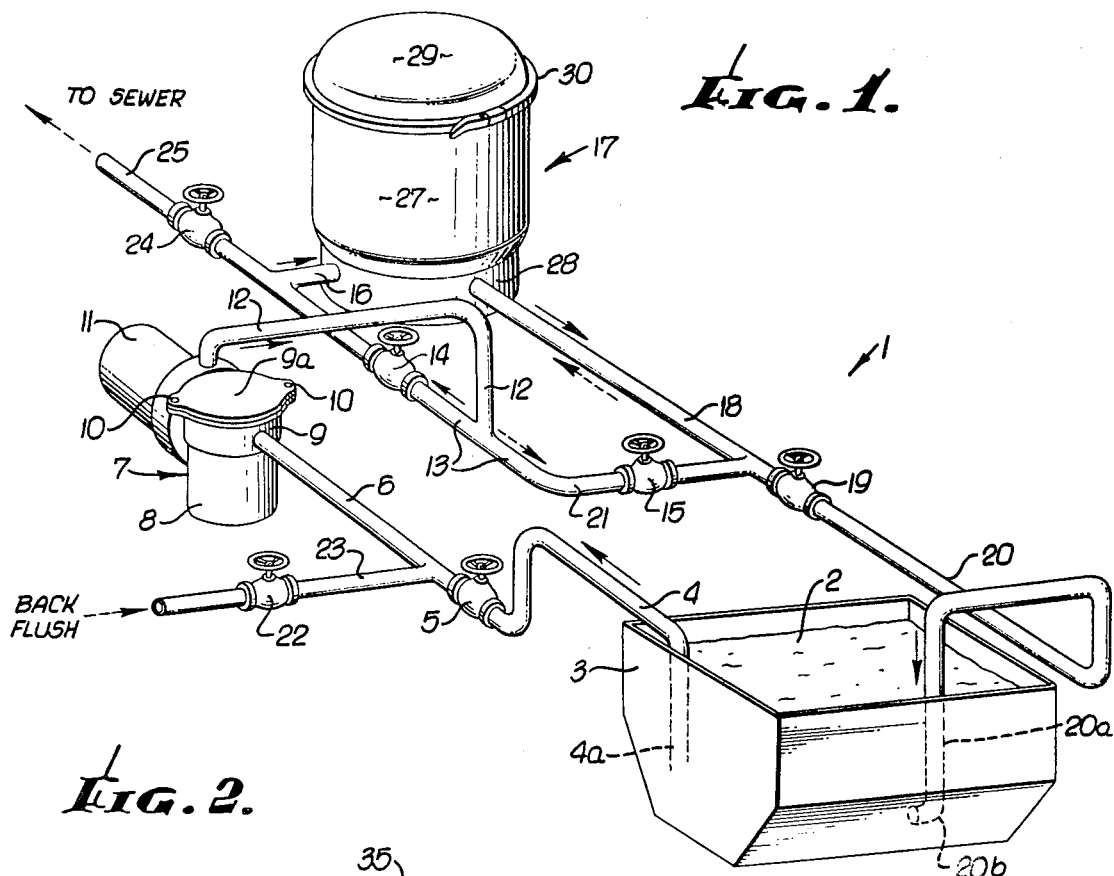
FIG. 1 is a pictorial view of a portion of a chemical treating bath set-up showing the treating tank and the pump and filter of the invention apparatus connected thereto and without the conventional metal part handling equipment being shown.

For clarity of illustration the appurtenant equipment to the chemical treating operation such as conveyor lines for carriage of metal parts to be treated, spray nozzles normally disposed above the bath and arrayed to impinge treating solution onto the conveyed parts and associated hoses, heaters and pumps have been omitted in the drawings as they are conventional and form no part of the present invention.

Broadly speaking the invention contemplates a chemical treating bath and a filter device connected by a pump for pressure circulating bath solution through the filter device. Thus, and with reference to FIG. 1, the invention provides apparatus generally indicated at 1 for separating finely divided solids generated in a chemical treating solution 2 contained in generally V-shaped trough or tank 3. The generation of the finely divided, frequently gelatinous solids occurs spontaneously with metal treating as a by-product of the treatment reaction. In order to separate these solids a side stream with pump and filter device is provided. The side stream comprises an intake pipe 4 connected through valve 5 and filter inlet pipe section 6 to the suction side of pump 7. Pump 7 may be of the centrifugal type and include a pumping chamber 8, scale trap 9 closed with cover plate 9a held there with fasteners 10 and an electrical motor indicated at 11 and connected to a power supply (not shown). Pump outlet pipe section 12 enters filter feed line 13 and leads through valve 14 and filter intake pipe 16 to filter device 17, the construction details of which will be described in conjunction with FIG. 2. The filter outlet pipe 18 connects through valve 19 with tank return pipe 20 for solution return to tank 3. Valve 15 across reverse flow pipe section 21 between the connection of pump outlet pipe section 12 to filter feed line 13 and filter outlet pipe 18, back flush valve 22 across fresh water intake 23 and sewer connection valve 24 across sewer line 25 complete the piping around the pump 7 and filter device 17.

It will be noted that intake pipe 4 has a stand-pipe portion 4a within the tank 3 and extending to adjacent the tank bottom 26 for better withdrawing the finely divided solids portion of the solution 2 in the tank. The terminal configuration and positioning of the tank return pipe 20 within the tank 3 is also an aspect of the invention. It will be noted that the submerged portion 20a of the pipe is terminally adjacent the tank bottom 26 and is carried to be parallel thereto in its most terminal portion 20b. In this manner the return stream is most effectively directed across the tank bottom 26 to agitate and stir up sedimentary precipitates which may accumulate there for ready withdrawal from the tank 3 by the intake pipe 4.

Figure 2:
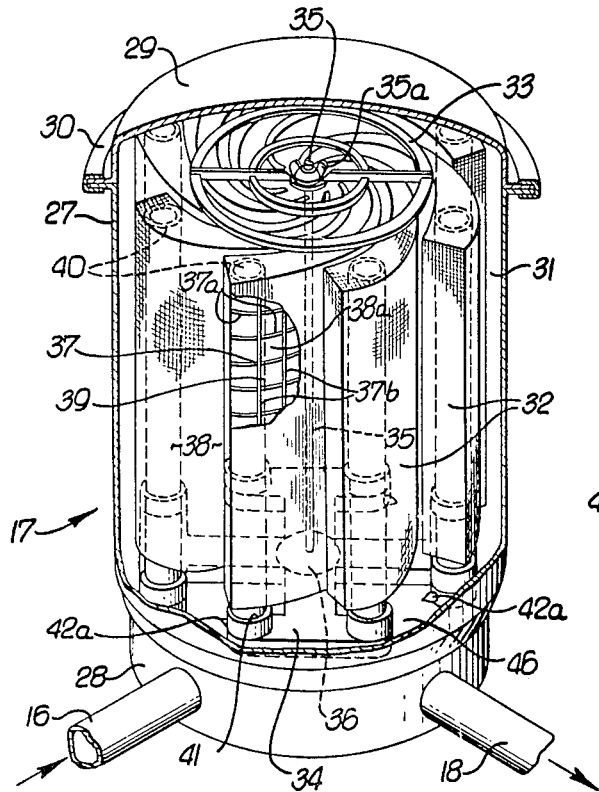
FIG. 2 is a view generally in elevation of one form of the filtering means and partly broken away to show the underlying filter element arrangement.
Figure 3:
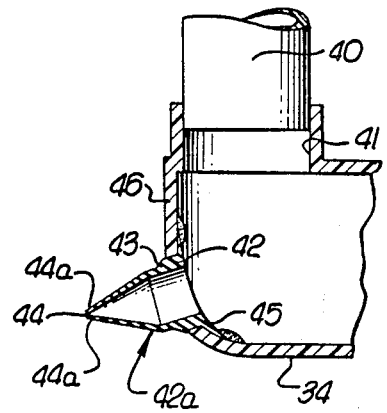
FIG. 3 is an enlarged detail view of the apparatus manifold jetting feature.

With reference to FIG. 2 a highly preferred form of filter device 17 is depicted to comprise an enclosure in the form of a cylindrical sheet metal housing 27 having a reduced diameter base 28 and a domed cover 29 secured thereon by clamping ring 30. Filter chamber 31 within housing 27 contains a plurality of radially arranged filter elements 32 supported in position at the top by a spacer ring 33 and at the bottom by a manifold 34, held together with threaded retaining rod 35 carrying wing nut 35a. Filter inlet pipe 16 enters the filter device 17 through its base 28 and communicates with a centrally disposed nozzle 36 to pass intake solution upwardly in filtering contact with the filter elements 32.

The filter elements 32 in simplest form may be one or more planar leaves of filter material e.g. porous cloth, but in preferred form the elements comprise arcuate grids 37 typically of molded plastic as shown or woven wire, of suitable chemical and thermal resistance for filtering heated solution from tank 3, covered with porous cloth 38 suitably of Dacron, nylon or other chemically resistant and strong material to define interior zones e.g. zone 39 between adjacent horizontal grid ribs 37a and vertical grid spacers 37b and opposing filter cloth panels 38a into which zones solution filtrate may pass while the finely divided solids thereof are retained on the filter cloth. Horizontal grid ribs 37a have appreciable width, relative to the area of adjacent panels, such as panel 38a, whereby the opposing cloth panels do not come in contact during filtering operations. The grid ribs 37a further serve to carry filtrate horizontally within the filter elements 32 to downcomer 40, a tubular member, suitably integrally formed with grid 37 and having apertures, (not shown) for receiving filtrate from the ribs 37a for conveying the filtrate downwardly out of filtering contact with the elements 32. Downcomers 40 empty into openings 41 of the manifold 34 for filtrate collection and ultimate return through filter outlet pipe 18, with which the manifold is in communication, to the tank 3.

To operate the apparatus 1 valves 5, 14 and 19 are open and valves 22, 24 and 15 are closed. Pump 7 operation sucks a finely divided solids portion of the solution 2 into line 4 and through open valve 5 into filter intake pipe 6. The pump 7 discharges the portion under pressure through pump outlet pipe 12 into filter feed pipe 13, through open valve 14 and into the base 28 of the filter device 17. The solution portion always under direct pump pressure is passed upwardly from nozzle 36 onto and along cloth 38 on the grids 37 of filter elements 32, through the filter chamber 31 which is at all times hydraulically full.

It has been found that the finely divided solids form a coating on the filter elements and itself serves as a filtering medium for subsequently introduced filterable solids.

Portions of the solution substantially free of solids herein termed filtrate are passed through the particulate filtering medium and the filter cloth and are collected within the elements 32 on horizontal ribs 37a whence the filtrate flows laterally into the downcomers 40 where it is collected by manifold 34 for return to tank 3 along filter outlet pipe 18 through valve 19 and tank return pipe 20, which delivers the filtrate in a manner to agitate the solids remaining in the tank.

It is a signal advantage of the present method and apparatus that sludge disposal and filter regeneration are readily accomplished. Thus by closing valves 5, 14 and 19 and opening valves 22, 15 and 24 the flow direction, this time of fresh water, through the filter device 17 is reversed. Water rises in the downcomers 40 and flushes the solids accumulated on the filter cloth 28 into nozzle 36 whence it passes through line 16, through valve 24 and out to sewer through line 25. Jet openings 42 may be provided in manifold 34 for flushing sediment in the chamber 31 below the filter elements 32 into nozzle 36 for drainage to sewer.

One way pressure responsive valves 42a are provided in openings 42 to permit fluid passage only on the backflush cycle. Valves 42a comprise conical plugs 43 of elastomeric material slit axially at 44 and fixed in openings 42 with sealing flanges 45 on either side of the manifold wall 46 in which the openings are formed in a manner to collapse against liquid ingress and to act as nozzles for liquid egress. In normal operation hydraulic pressure within chamber 31 keeps lips 44a pressed together and opening 42 thus closed. On backflush lips 44a open to emit a jet of liquid out and down from the manifold 34 and preferably in a circular pattern to flush sediment from the area 46 below the manifold.

It will be apparent from the foregoing that the present invention provides a rapid and effective filtration system. Its rapidity deriving from continuous pressure operation enables swift return of solution to the bath and this means minimum heat loss for the bath. Moreover the constant pressure tightly presses the solids against the filter means squeezing substantially all the solution from the filter cake whereby waste of solution with thrown away sludge is minimized. By running fresh water through the filter, all of the phosphate solution can be washed back to the tank 2. Thus, there need be no waste of process solution.

I claim:

1. Apparatus for separating finely divided solids from a tank containing a chemical treating bath in which gelatinous solids are generated, which comprises pumping means having an inlet and an outlet and arranged to draw a solids-containing portion of the solution to its inlet and to discharge the same under pressure from its outlet, flow reversible means to pressure communication with the pumping means outlet for selectively passing the liquid component of the solution as filtrate, said filtering means comprising a housing, a series of vertically disposed filter elements therein, means for passing said solution portion under pump pressure upwardly in filtering contact with said elements, means for conveying said filtrate downwardly out of contact with said elements within the housing, means to periodically reverse flow direction through the filtering means, jet means for flushing sediment from below the filter elements means to pass flushed sediment and element accumulated solids from the housing in reversed flow operation periods of the filtering means through the housing inlet to waste, and means to return filtrate to the bath solution.

2. Apparatus according to claim 2 in which said filter elements each comprise a grid-like arcuate frame and filter cloth on the frame faces spaced by the frame.

3. Apparatus according to claim 3 in which said elements are arranged radially and including also a housing inlet and an outlet, and manifold means within said chamber and in communication with said outlet for collecting filtrate from the elements, said jet means being formed in said manifold means.

4. Apparatus according to claim 3 in which said jet means includes an opening formed in the lower wall of said manifold means and including also a pressure responsive combination valve and nozzle means for controlling liquid passage through said opening, said last mentioned means being constructed to jet backflush liquid circularly beneath said manifold means.

* * * * *

UNITED STATES PATENT OFFICE
CERTIFICATE OF CORRECTION

Patent No. 3,773,178    Dated November 20, 1973

Inventor(s) Marshall Richard Bland

It is certified that error appears in the above-identified patent and that said Letters Patent are hereby corrected as shown below:

Column 6, line 16; "2. Apparatus according to claim 2 in which said filter" should read --2. Apparatus according to claim 1 in which said filter--.

Column 6, line 19; "Apparatus according to claim 3 in which said ele-" should read --Apparatus according to claim 2 in which said ele- --.

Signed and sealed this 30th day of July 1974.

(SEAL)
Attest:

McCOY M. GIBSON, JR.
Attesting Officer

C. MARSHALL DANN
Commissioner of Patents